(12) United States Patent
Meaden (10) Patent No.: US 6,864,905 B2
(45) Date of Patent: Mar. 8, 2005

(54) METHOD TO REDISPLAY ACTIVE PANELS

(75) Inventor: Jeffrey Alan Meaden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 09/816,162

(22) Filed: Mar. 23, 2001

(65) Prior Publication Data

US 2002/0171683 A1 Nov. 21, 2002

(51) Int. Cl.[7] .................................................. G06F 3/00
(52) U.S. Cl. ...................... 345/806; 345/783; 345/794; 345/802; 345/779; 345/835
(58) Field of Search .................................. 345/764, 806, 345/781, 783, 790, 791, 794, 795, 796, 797, 802, 767, 779, 799, 835

(56) References Cited

U.S. PATENT DOCUMENTS

| | | | |
|---|---|---|---|
| 5,060,170 A | 10/1991 | Bourgeois et al. | 364/521 |
| 5,140,678 A | 8/1992 | Torres | 395/159 |
| 5,204,947 A | 4/1993 | Bernstein et al. | 395/157 |
| 5,241,656 A | 8/1993 | Loucks et al. | 395/158 |
| 5,283,560 A | 2/1994 | Bartlett | 345/113 |
| 5,377,317 A | 12/1994 | Bates et al. | 395/157 |
| 5,434,965 A | 7/1995 | Matheny et al. | 395/159 |
| 5,491,795 A | 2/1996 | Allen et al. | 395/159 |
| 5,550,563 A | 8/1996 | Matheny et al. | 345/168 |
| 5,581,670 A | 12/1996 | Bier et al. | 395/326 |
| 5,590,265 A | 12/1996 | Nakazawa | 395/340 |
| 5,598,524 A | 1/1997 | Johnston, Jr. et al. | 395/348 |
| 5,608,850 A | 3/1997 | Robertson | 395/127 |
| 5,617,114 A | 4/1997 | Bier et al. | 345/113 |
| 5,621,878 A | 4/1997 | Owens et al. | 395/326 |
| 5,630,080 A | 5/1997 | Malamud et al. | 395/346 |
| 5,764,229 A | 6/1998 | Bennett | 345/345 |
| 5,805,163 A | 9/1998 | Bagnas | 345/345 |
| 5,831,615 A | 11/1998 | Drews et al. | 345/344 |
| 5,835,091 A | 11/1998 | Bailey et al. | 345/345 |
| 5,841,420 A | 11/1998 | Kaply et al. | 345/118 |
| 5,874,958 A * | 2/1999 | Ludolph | 345/781 |
| 5,892,511 A * | 4/1999 | Gelsinger et al. | 345/794 |
| 5,920,315 A | 7/1999 | Santos-Gomez | 345/342 |
| 5,920,316 A * | 7/1999 | Oran et al. | 345/779 |
| 6,002,397 A | 12/1999 | Jaaskelainen, Jr. | 345/340 |
| 6,072,486 A * | 6/2000 | Sheldon et al. | 345/835 |
| 6,437,807 B1 * | 8/2002 | Berquist et al. | 345/764 |

* cited by examiner

*Primary Examiner*—Raymond J. Baveri
*Assistant Examiner*—Kieu D. Vu
(74) *Attorney, Agent, or Firm*—Moser, Patterson & Sheridan, LLP (57) ABSTRACT

Systems, methods, and articles of manufacture are provided that allow multiple instances of an image to be displayed for different objects. In one embodiment, only one instance of an image is allowed to be displayed for a particular object. A tracking mechanism contains a reference to each active (displayed) image. The reference can be resolved into a unique value identifying each image. If the user requests an action on an object, steps are taken to construct a unique image value for the object and then determine whether the image is already active. If the image is active, the image is repositioned. Repositioning may be accomplished, for example, by moving the image to the foreground of a user interface.

28 Claims, 6 Drawing Sheets

METHOD TO REDISPLAY ACTIVE PANELS

BACKGROUND OF THE INVENTION

1. Field of the Invention

Embodiments of the present invention relate to data processing. In particular, methods and systems for redisplaying viewable entities are provided.

2. Background of the Related Art

In a user interface (UI) environment objects, such as windows, can be displayed. Where multiple instances of windows exist, the windows can overlap each other such that one window may partially or completely obscure another window. A window may also be 'minimized' such that the window is represented as an icon on the user interface or might even be completely hidden from the user interface.

In a user interface hosting a windows environment, the user may request an action on an object that causes a window to be displayed. Then, before the window is closed, the user may request the same action on the same object again. In this case, the computer system may be configured for various methods of responding to the user's request. In one configuration, the application that displays the window may only allow one instance of the application to be active at a time. Accordingly, only one instance of the application's window can be displayed to the user at a time. If only one instance of the application/window is allowed, and the user requests to start a second instance of the application, then the application would detect that the an instance is already running and takes steps to prevent a second instance of the application from starting.

Typically, these types of applications do not deal with specific objects, but rather have a system-wide or signed-on-user scope. For example, an e-mail application might be designed such that the user can only have one instance of the application/window active at a time. Another example is the Windows Task Manager.

In an alternative configuration, the application that displays the window may allow more than one instance of the application to be active at a time. Since many instances of the application can be running simultaneously, there can be many instances of the application's window displayed to the user at a time. For example, properties windows for several files might be displayed simultaneously. Typically, these types of applications deal with specific objects.

For the first configuration, in which only one instance of the application is permitted, the application may react in one of various ways to the user's request to start the application a second time. For example, the user's second request to start the application may be ignored. Alternatively, an error message may be issued telling the user that the application is already active. Still another approach is to allow a second instance of the application to run just long enough to detect that the first instance of the application is already running and notify the first instance of the application that the user wants to see the application. The second instance of the application would then exit. The first instance of the application would then make itself visible (e.g., bring itself to the foreground, unminimize itself, etc.). In this last approach multiple objects can be simultaneously acted upon by the single instance of the application. For example, if the first action was to edit file Xyz and the second action was to edit file Abc, then a single instance of edit application would still be enforced, but the application would internally manage multiple files that are being edited via a mechanism such as a file list.

The second configuration, in which multiple instances of the application are permitted, may also provide various ways in which the application handles the user's request to start the application a second time. Of particular interest is how the application handles a user's request to display the application/window for an object that is already being operated on by another instance of the application. In one implementation, if the application/window for the object is already active, the user's second request to display application/window is ignored. In another implementation, the user is given an error message indicating that the application/window for the object is already active. In still another implementation, a second instance of the application/window for the object is displayed to the user, even if an instance is already active for the object that the user started the application for. For example, suppose the original action was to edit file Xyz and an edit window for file Xyz was displayed to the user. When the user requests to edit file Xyz again, a second edit window for file Xyz is displayed and the user would have two edit sessions for file Xyz active at the same time. In still another implementation, if the application/window is already active for the object being acted upon, then the existing window for that object is made visible (brought to the foreground, unminimized, etc.). Otherwise, a new window is displayed for the object. For example, suppose the original action was to edit file Xyz and an edit window for file Xyz was displayed to the user. When the user requests to edit file Xyz a second time, the previously-created edit window for file Xyz is shown to the user and the user would still have just one edit session for file Xyz. However, if the second action is to edit file Abc, then a second edit window is created for file Abc. Thus, the user would have two edit windows open simultaneously, but they would be for different files.

This last implementation is particular advantageous in a multiple windows environment in which users desire to move between the windows and require that only one instance of an application for a given object exist to avoid creating conflicts. The windows management facilitated by this implementation gives users confidence to operate in the multiple windows environment.

However, one problem with this last implementation is its reliance on a platform-specific mechanism to keep track of whether or not a particular window is active. In this context, a 'platform' is defined to be the environment that an application runs in. The platform provides certain operating and programming interfaces that the application can use to perform its functions. Examples of platforms include operating systems, such as Windows, Linux, OS/400, the Palm Pilot OS, etc. The Windows Registry is an example of a platform-specific interface. For example, the Windows Registry might be used to store information about active windows.

Platform-dependant implementations are adequate if the application is intended to only run on one platform. However, this design requires code modifications (porting) in order to make the application run on platforms other than the one it was originally written for. For example, an application that was written for Windows and used the Windows Registry would need to be modified to use a replacement for the Windows Registry in order to run on Linux. Therefore, it is desirable for the implementation to be platform-independant so that the application can provide the desired behavior on multiple platforms without modification.

Another limitation of current windows management implementations is redundant code. Some designs could require that each application provide code to implement the mechanism of keeping track of its windows. This leads to duplication of effort in developing the application. Accordingly, it is desirable for the implementation to provide a common set of code for storing and managing the set of active windows. Applications requiring this capability can then just use the predefined functions, rather than re-implementing them. This results in efficient code development.

Another disadvantage to conventional windows management implementations is their complexity. Within a given UI environment, there could be several applications that each implement their own method(s) of keeping track of active windows. This leads to complexity, especially if there is code outside of those applications that needs to "know" how to access each application's active windows. Accordingly, it is desirable to provide a single implementation for storing and managing the set of active windows in order to simply the application environment.

Therefore, what is needed is a method and system for keeping track of active windows such that if the user requests to display a window that is already active, the existing window can be located and arranged to be viewable. Preferably, the implementation method provided is platform independent, avoids redundant code, and is sufficiently simple for applications to code to.

SUMMARY OF THE INVENTION

Embodiments of systems, methods and articles of manufacture are provided for displaying an image in a user interface. One embodiment provides a system comprising an input device configured to receive input events, a display device configured to display an image for each of at least two objects in a user interface (UI), a memory comprising a display program and a processor operably connected to the display device and the input device and configured to receive the input events. The display program comprises (i) an image tracking mechanism configured to contain a reference to each image and (ii) an active panel method configured to request a key for an image to be displayed, wherein the key is a unique value for the image to be displayed. The processor, when executing the display program, is configured to track each image that is currently active using the reference associated with each image and contained in the image tracking mechanism, receive an event indicating that a first image associated with a first object is to be displayed on the display device, and determine whether the first image is already active. Determining whether the first image is already active comprises determining whether a match exists between a first image key associated with the first image and a unique image value for each active image. If the first image is already active, the processor is configured to reposition the image into a viewable position in the display device. If the first image is not already active, the processor is configured to create the image, store a reference to the image in the image tracking mechanism and display the image in the prominent viewing position.

Another embodiment provides a system comprising an input device configured to receive input events, a display device configured to display an image for each of at least two objects in a user interface (UI), a memory containing a display program and a processor configured to execute the display program. The processor is operably connected to the display device and the input device and is configured to receive the input events. The display program comprises a UI object configured to provide a unique object identifier for an object, an image tracking mechanism configured to contain a reference to each image and comprising an active panel method configured to request a key for an image to be displayed and an image manager instance for each image. Each image manager instance comprises (i) an image identifier (ID) method configured to request a unique image value identifying the image manager instance and (ii) a display method configured to display the image. The processor, when executing the display program, is configured to track each image that is currently active using an associated reference contained in the image tracking mechanism, receive an event indicating that a first image associated with a first object is to be displayed on the display device, and determine whether the first image is already active by determining whether a match exists between the key associated with the first image and each unique image value. If the first image is already active, the processor is configured to reposition the image into a viewable position in the display device. If the first image is not already active, the processor is configured to create the image, store a reference to the image in the image tracking mechanism and display the image in the prominent viewing position.

Another embodiment provides a method of displaying an image in a user interface containing at least two images each having an associated object. The method comprises receiving an event that a first image associated with a first object is to be displayed in the user interface, constructing a key uniquely identifying the first image and determining whether the key matches a unique image value for each additional image active in the user interface. A match indicates that the first image is already active in the user interface. If the key matches, the first image is repositioned into a viewable position within the user interface and if the key does not match, the first image is created and displayed in the user interface.

Still another embodiment provides a signal bearing medium, comprising a program which, when executed by a processor, performs a method of displaying an image in a user interface containing at least two images each having an associated object. The method comprises receiving an event that a first image associated with a first object is to be displayed in the user interface, constructing a key uniquely identifying the first image and determining whether the key matches a unique image value for each additional image active in the user interface. A match indicates that the first image is already active in the user interface. If the key matches, the first image is repositioned into a viewable position within the user interface and if the key does not match, the first image is created and displayed in the user interface.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

It is to be noted, however, that the appended drawings illustrate only typical embodiments and are therefore not to be considered limiting of scope, for the invention may admit to other equally effective embodiments.

DETAILED DESCRIPTION OF THE PREFERRED EMBODIMENTS

Systems, methods, and articles of manufacture are provided that allow multiple instances of an image to be displayed for different objects. In one embodiment, only one instance of an image is allowed to be displayed for a particular object. A tracking mechanism contains a reference to each active (displayed) image. The reference can be resolved into a unique value identifying each image. If the user requests an action on an object, steps are taken to construct a unique image value for the object and then determine whether the image is already active. If the image is active, the image is repositioned. Repositioning may be accomplished, for example, by moving the image to the foreground of a user interface.

Figure 1:
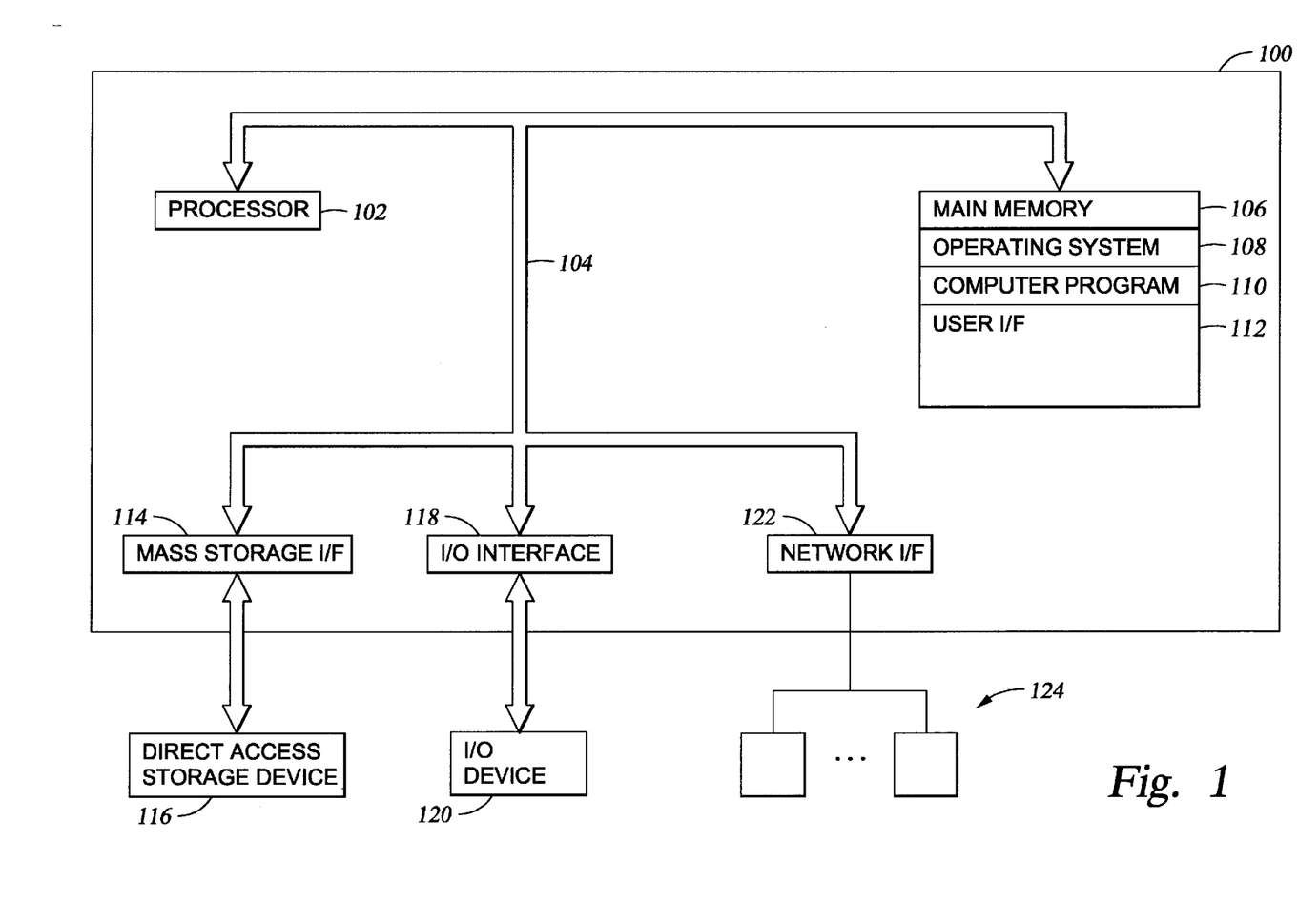
FIG. 1 is a high level diagram of a computer system.

Computer system 100 is shown for a multi-user programming environment that includes at least one processor 102, which obtains instructions and data via a bus 104 from a main memory 106. The processor 102 could be a PC-based server, a minicomputer, a midrange computer, a mainframe computer, etc. adapted to support the methods described below. Illustratively, the processor is a PowerPC available from International Business Machines of Armonk, N.Y.

The main memory 106 includes an operating system 108, a display program 110 and a user interface program 112. The main memory 106 could be one or a combination of memory devices, including Random Access Memory, nonvolatile or backup memory, (e.g., programmable or Flash memories, read-only memories, etc.) and the like. In addition, memory 106 may be considered to include memory physically located elsewhere in a computer system 100, for example, any storage capacity used as virtual memory or stored on a mass storage device or on another computer coupled to the computer system 100 via bus 104.

The computer system 100 includes a number of operators and peripheral systems. Illustratively, these include a mass storage interface 114 operably connected to a direct access storage device 116, a input/output (I/O) interface 118 operably connected to I/O devices 120, and a network interface 122 operably connected to a plurality of networked devices 124. The I/O devices may include any combination of displays, keyboards, track point devices, mouse devices, speech recognition devices and the like. In some embodiments, the I/O devices are integrated, such as in the case of a touch screen. The networked devices 124 could be displays, desktop or PC-based computers, workstations, or network terminals, or other networked computer systems.

In general, the routines executed to implement the embodiments of the invention, whether implemented as part of an operating system or a specific application, component, program, object, module or sequence of instructions will be referred to herein as a "display program 110", or simply "program 110". The program 110 typically comprises one or more instructions that are resident at various times in various memory and storage devices in a computer, and that, when read and executed by one or more processors in a computer, cause that computer to perform the steps necessary to execute steps or elements embodying the various aspects of the invention.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Moreover, while the embodiments have and hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

When executed, the display program 110 is configured to conditionally display an image on an output device, such as one of the I/O devices 120. As used herein, "image" refers to any graphical representation which may be viewed on an output device and graphically represents an object of the computer system 100, such as servers, disk drives, I/O devices, text file icons, image file icons, shortcuts, desktop icons, folders, files, images, menu items, tool bar icons, buttons, users, groups, servers, workstations, printers, applications, processes, threads and the like. Images include windows, panels, panes, frames, buttons, icons, and the like. Although embodiments are described herein with reference to panels and windows, the embodiments are not intended to be limited to panels or windows, which are merely illustrative.

Figure 2:
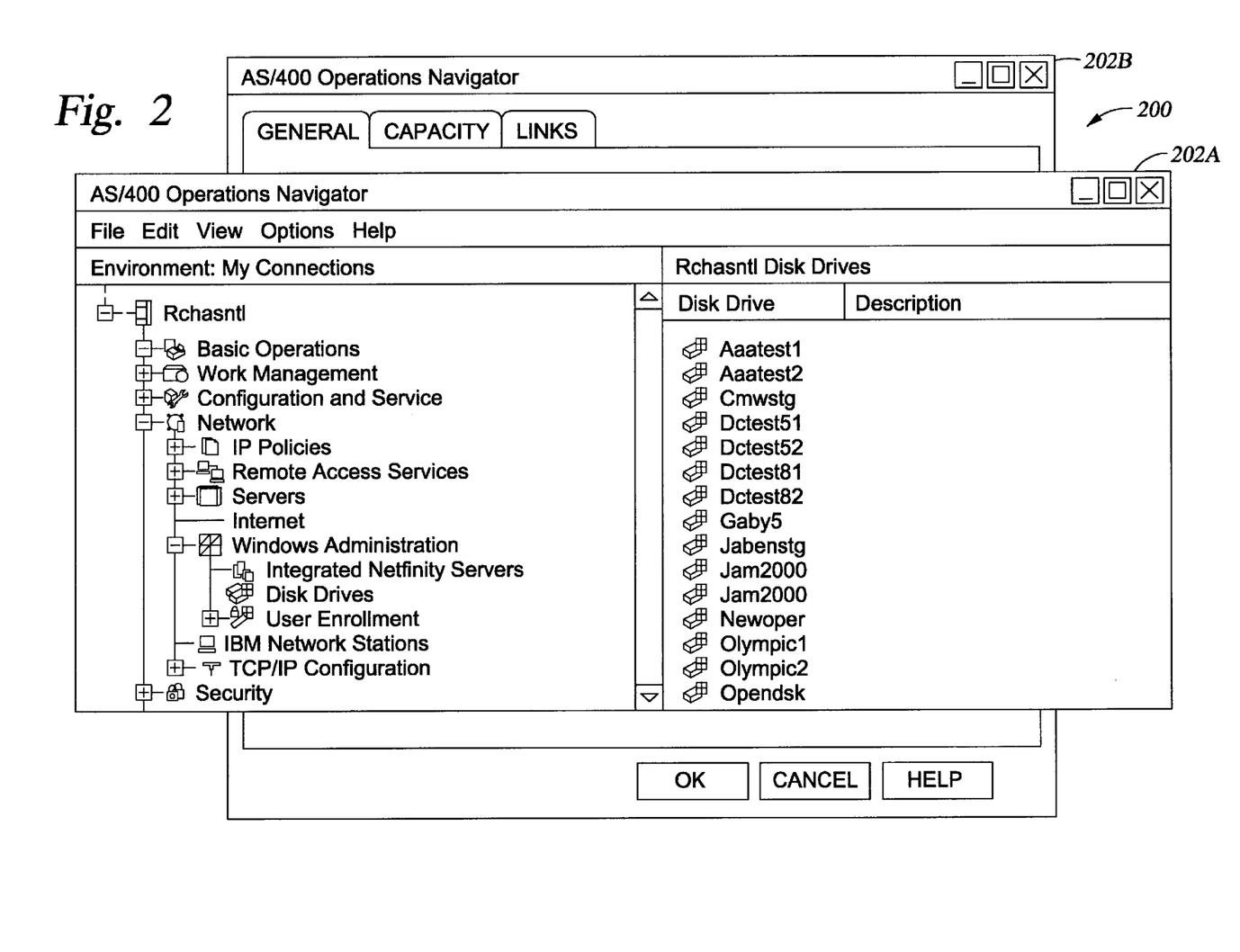
FIG. 2 is a graphical user interface depicting a collection of objects contained within a pair windows.
Figure 3:
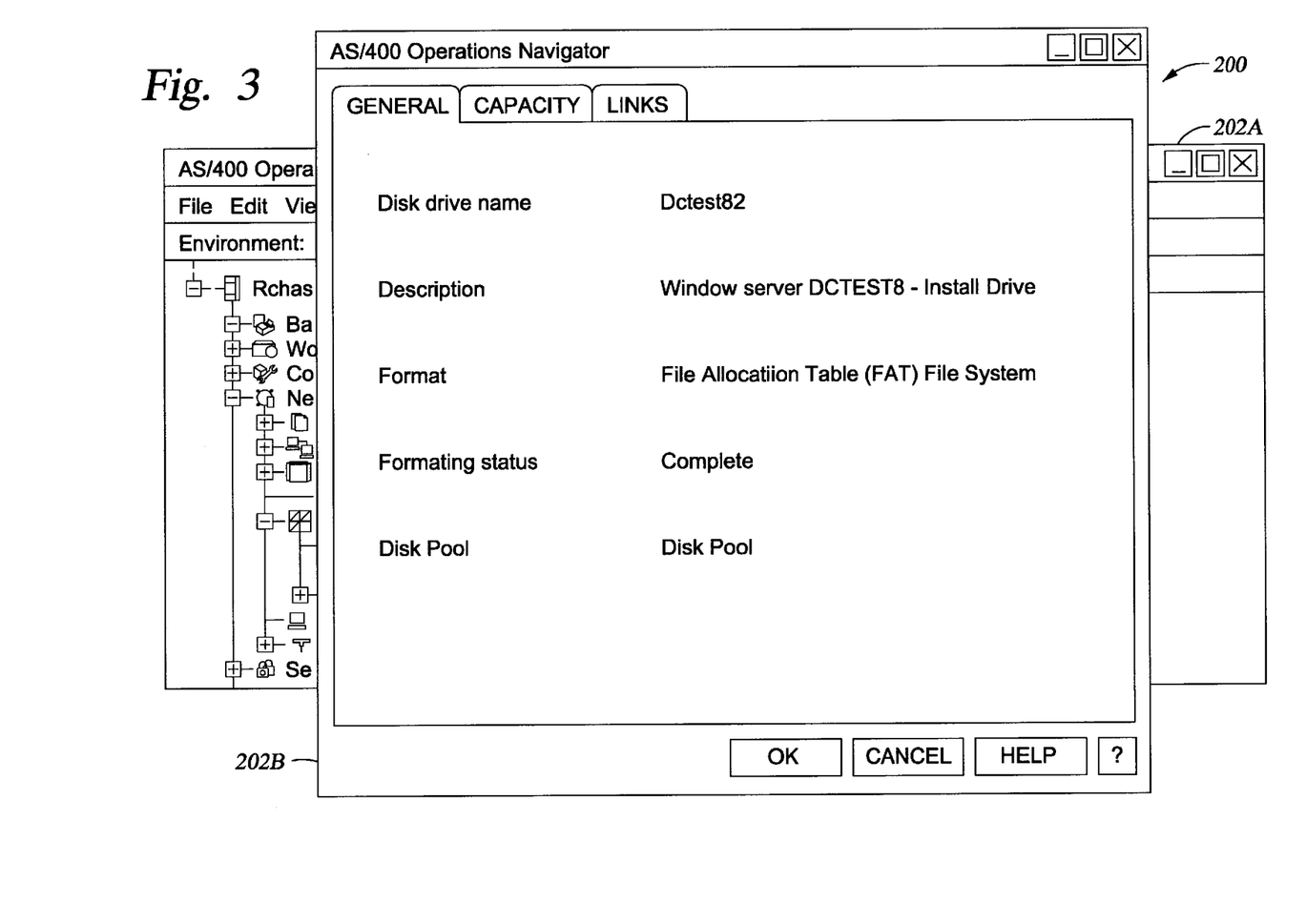
FIG. 3 is a graphical user interface in which a first window has been repositioned to the foreground of the interface.

A display operation is illustrated with reference to FIGS. 2–3. FIG. 2 shows an exemplary user interface (UI) 200, which is a particular implementation of the interface 112 shown in FIG. 1. Illustratively, the UI 200 is a GUI hosting a Windows environment. In other embodiments, the UI 200 may be a green screen environment or any other environment adapted to contain images.

The UI 200 includes a plurality of images 202A–B; illustratively, a pair of windows. Although only two windows are shown, embodiments of the invention provide for managing any number of windows. Initially, a first window 202A is in the foreground. The first window comprises a frame containing a plurality of objects with which a user may interact. Illustratively, the user highlights the object "Dctest82" in order to view its properties. The display program 110 is then executed to determine whether a window displaying the properties is already open/active. In this case, the properties are being displayed by the second window 202B. Therefore, the display program 110 takes steps to move the second window 202B to the foreground while keeping the first window 202A active in the background. The resulting relative positioning of the windows 202A–B is shown in FIG. 3. In some embodiments, the relative positioning between active windows is user configurable. For example, a user may configure the display program 110 to move a window from a background position into juxtaposition relative to the other active windows, thereby allowing the user to view all active windows. In another embodiment, the windows selected for display is maximized while the other active windows are minimized.

In this manner, the display program 110 is configured to reposition active images representing various objects without opening additional images to represent the same object. The operational relationship of the display program 110 may be understood with reference to FIG. 4 which provides an exemplary software environment for the computer system 100 of FIG. 1. In a particular embodiment, the display program 110 is implemented as a Java program. However, the particular program language is not germane to embodiments of the invention and is therefore not considered limiting. In other embodiments, languages such as C++, Object Pascal, Smalltalk, Pascal, C, Basic, COBOL and the like.

Figure 4:
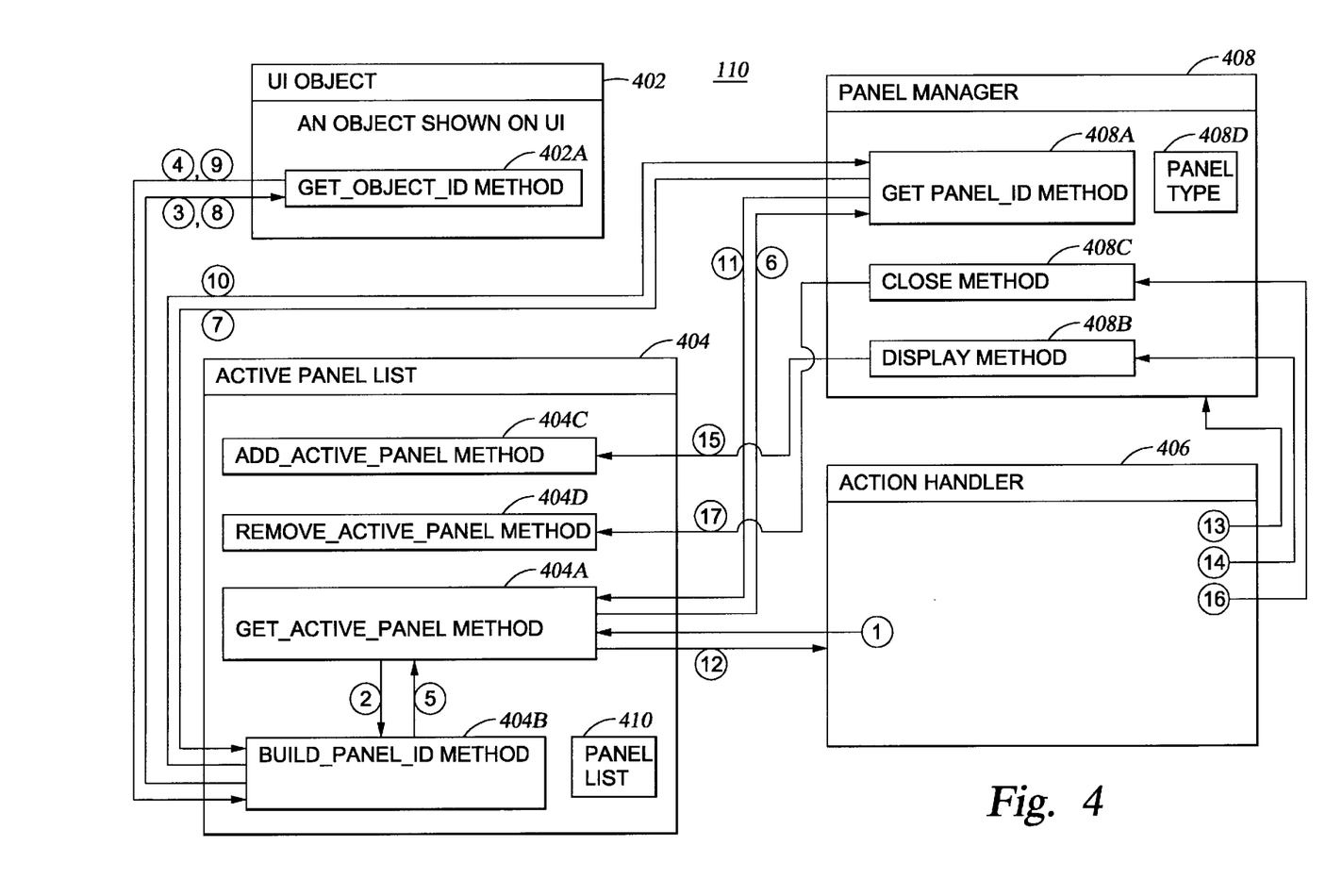
FIG. 4 is a block diagram illustrating relationships between software components of a display program.

Generally, the display program 110 comprises a User Interface (UI) Object 402, an Active Panel List Class 404 (herein referred to as "active panel list 404"), an Action Handler 406 and a Panel Manager 408. Each of the components of the display program 110 comprises associated methods. Solid lines represent process flow relationships between the methods and the components, and will be described in more detail below.

The UI Object 402 represents an object displayed on a user interface. The UI Object 402 has a GET_OBJECT_ID method 402A defined for it. The GET_OBJECT_ID method 402A is configured to return a unique object ID value that uniquely identifies an object in a UI environment. As will be described below, this method is also used as the basis for generating unique panel ID values that are used to keep track of which panels are being displayed.

The Action Handler 406 is configured to detect when an entity (e.g., a user) initiates an action on one or more objects which have implemented the UI Object 402. For example, in an event-driven embodiment, the Action Handler 406 may be configured to "listen" for events specifying actions on the objects. Specifically, the Action Handler 406 responds to actions requesting that a particular panel be displayed. Upon detection of such an action, the Action Handler 406 determines whether the panel is already active. This determination is initiated at numeral one (1) of the process sequence shown in FIG. 4. If the panel is already active, steps are taken to move the panel to the foreground of the UI, or otherwise reposition the panel. If the panel is not active, the Action Handler 406 takes steps to create an instance of the panel.

In determining whether a panel is active, the Action Handler 406 first retrieves a static data element from the appropriate Panel Manager class 408, wherein the static data element represents a panel type. The Panel Manager class 408 represents a category of classes for various panel types, e.g., server panels, disk drive panels, etc. Accordingly, each Panel Manager class comprises a panel type 408D indicative of the type of panel represented by a particular Panel Manager 408.

The Action Handler 406 then calls a GET_ACTIVE_PANEL method 404A defined for the Active Panel List 404. The GET_ACTIVE_PANEL method 404A is configured to construct a unique panel ID value. To this end, the GET_ACTIVE_PANEL method 404A passes the object being operated on (or a reference to the object) and the panel type to a BUILD_PANEL_ID method 404B, also defined for the Active Panel List 404. The BUILD_PANEL_ID method 404B receives an object ID value from the GET_OBJECT_ID method 402A and combines this value with the panel type to yield a unique panel identifier for the panel. The unique panel identifier is then returned to the GET_ACTIVE_PANEL method 404A, which method and takes steps to determine whether a matching panel can be found in a panel list 410.

The panel list 410 is a tracking mechanism illustratively contained within the Active Panel List 404. In general, the panel list 410 represents any mechanism configured to track active panels. In one embodiment, the panel list 410 contains a list of references (e.g., pointers) to Panel Managers 408. For each panel manager contained within the panel list 410, a matching operation begins when the GET_ACTIVE_PANEL method 404A calls a GET_PANEL_ID method 408A defined for the Panel Manager 408. The GET_PANEL_ID method 408A then calls the BUILD_PANEL_ID method 404B to construct a unique panel ID in the manner described above. The unique panel ID is then returned to the GET_PANEL_ID method 408A and ultimately to the GET ACTIVE PANEL method 404A. A value is then returned to the Action Handler 406 indicating whether the panel is currently active or not.

If an instance of a Panel Manager 408 already exists, the Action Handler 406 simply calls the display method 408B for the Panel Manager 408. If the panel does not currently exist, the Action Handler 406 invokes an instance of the Panel Manager 408. The Action Handler 406 then calls the display method 408B of the newly created Panel Manager 408. The display method 408B, in turn, calls an ADD_ACTIVE_PANEL method 404C defined for the Active Panel List 404. The ADD_ACTIVE_PANEL method 404C is configured to take the Panel Manager instance as input and stores a reference to it in the panel list 410.

In some cases it is desirable to close a panel. In these cases, the Action Handler 406 is invoked to call a close method 408C, which is defined for an instance of the Panel Manager 408. The close method 408C, in turn, calls a REMOVE_ACTIVE_PANEL method 404D defined for the Active Panel List 404. This method 404D then removes the reference to the Panel Manager 408 being closed from the panel list 410.

Figure 5:
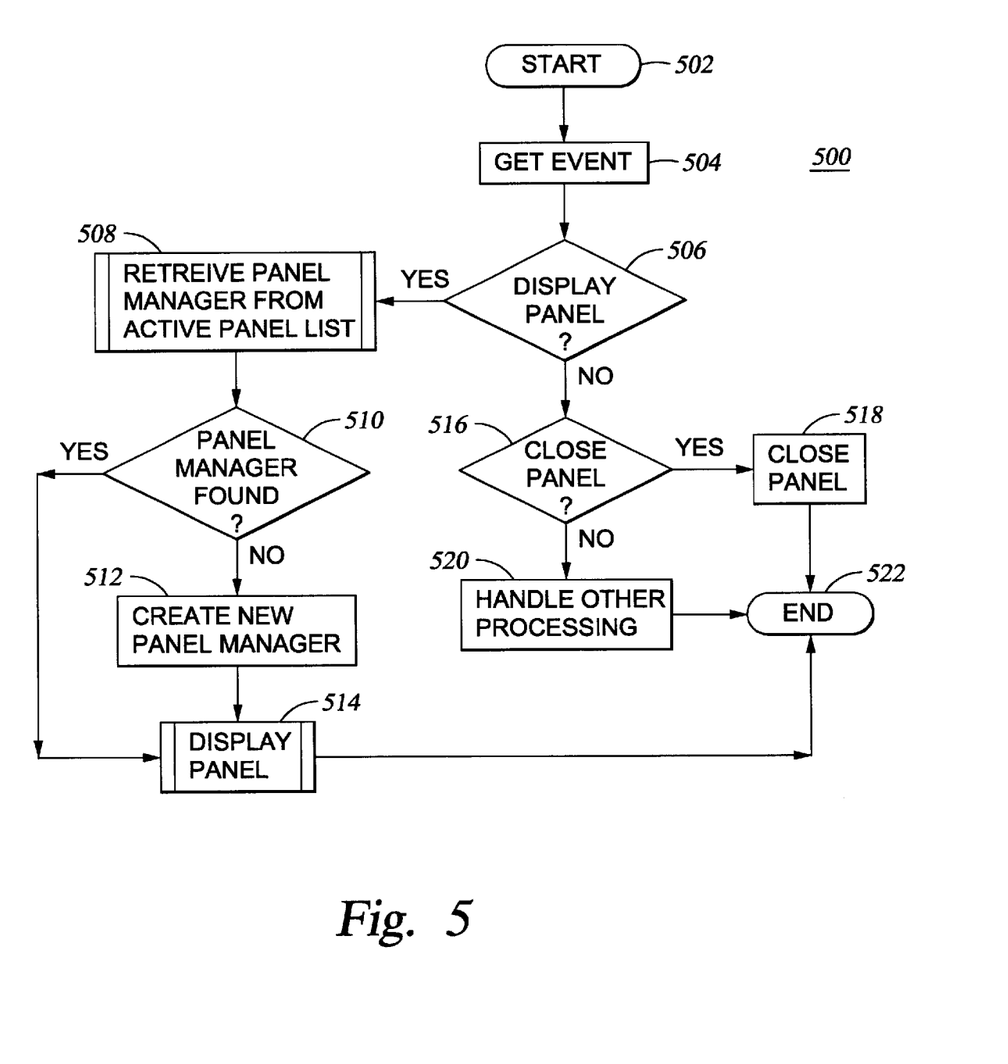
FIG. 5 is a flow chart illustrating event handling.

FIG. 5 shows a method 500 for processing events received by the processor 102 of the computer system 100. In one embodiment, the method 500 may be considered as implementing the operation of the Action Handler 406. The method 500 is entered at step 502 and proceeds to step 504 where an event is received. In general, the event passes in a reference to an object and an action to perform on the object. At step 506 the method 500 queries whether the event is a request to display a panel for an object. If so, the method 500 proceeds to step 508 to determine whether an instance of the panel (i.e., an instance of the Panel Manager 408) can be located in the Active Panel List 404. One embodiment of step 508 is described below with reference to FIG. 6. At step 510, the method 500 queries whether an instance of the Panel Manager was located. If so, the panel is displayed at step 514. One embodiment of step 514 is described below with reference to FIG. 7. If an instance of the Panel Manager was not located, an instance is created at step 512 and the panel is displayed at step 514. The method 500 then exits at step 522.

Returning to step 506, if the request is not to display a panel for an object, the method 500 proceeds to step 516 and queries whether the event is a request to close a panel. If so, the panel is closed at step 518. In the software environment described with reference to FIG. 4, closing a panel may be accomplished by calling the close method 408C for the appropriate instance of the Panel Manager 408. The close method 408C then calls the REMOVE_ACTIVE_PANEL method 404D which takes steps to remove the panel from the panel list 410. The method 500 then exits at step 522.

If the event received at step 504 is neither to display a panel for an object nor to close a panel, then the method 500 proceeds to step 520 to handle any other processing. The method 500 then exits at step 522.

Figure 6:
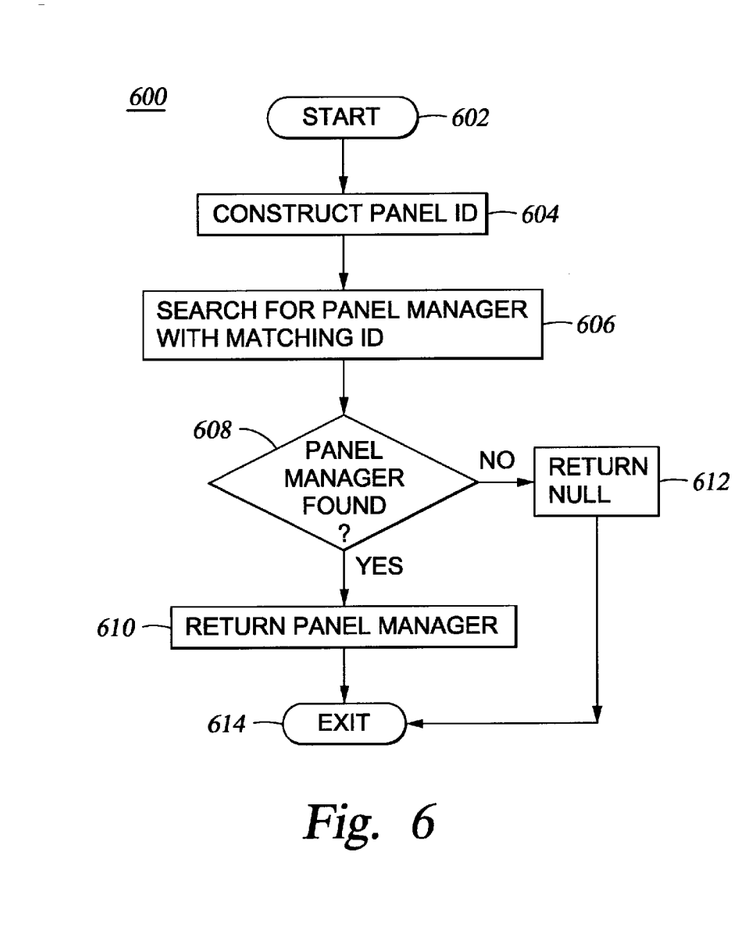
FIG. 6 is a flow chart illustrating a method of determining whether a panel is active.

A method 600 for determining whether an instance of a panel manager exists is shown in FIG. 6. In one embodiment, the method 600 may be considered an implementation of the Active Panel List 404. The method 600 is entered at step 602 and proceeds to step 604 where a unique panel ID (also referred to herein as a "key") is constructed. In one embodiment, the key is constructed using an object reference (passed in by the event) and a panel type 408D (provided by the appropriate Panel Manager 408). In the software environment described with reference to FIG. 4, the key is constructed by calling the GET_ACTIVE_PANEL method 404A, the BUILD_PANEL_ID method 404B, and the GET_OBJECT_ID method 402A. At step 606, the method 600 searches the panel list 410 for an instance of a Panel Manager 408 with a matching ID. That is, in the context of the software environment of FIG. 4, the processing sequence defined by numerals 6 through 11 is performed to build a unique panel ID and compare this ID to the key. This sequence is repeated for each reference in the panel list 410.

At step 608, the method 600 queries whether a matching Panel Manager was located in the panel list 410. If so, the method 600 returns the Panel Manager from the list 410 at step 610. Otherwise, a NULL value is returned at step 612. The method 600 is exited at step 614, at which point processing returns to method 500.

Figure 7:
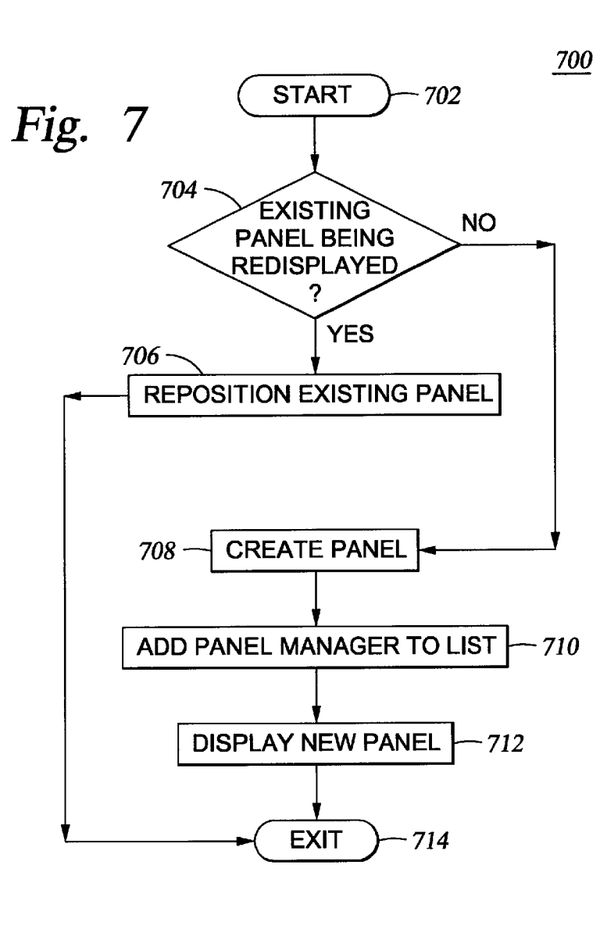
FIG. 7 is a flow chart illustrating a method of displaying a panel.

FIG. 7 shows a method 700 configured to handle displaying of panels. In one embodiment, method 700 may be considered an implementation of the Panel Manager 408. The method 700 is entered at step 702 and then proceeds to step 704 to query whether an existing panel is being redisplayed. If the panel was previously created, the method 700 proceeds to step 706 where the existing panel is repositioned to be made prominent, e.g., brought to the foreground of the UI. The method 700 then exits at step 714, at which point processing is returned to method 500.

If the panel was not previously created, then the method 700 proceeds to step 708 where the panel is created. At step 710, a tracking mechanism is configured to track the newly created instance of the Panel Manager. In the software environment described with reference to FIG. 4, the Panel Manager is added to the Active Panel List 404 by calling the ADD_ACTIVE_PANEL method 404C. The panel is then displayed in the UI at step 712. The method 700 exits at step 714.

Table I shows pseudo-code exemplifying one embodiment of the interfaces, classes and methods provided herein. In particular, the code of Table 1 represents an embodiment of the logic contained in steps 508, 510, 512 and 514 shown in FIG. 5. In this case, a class MyDisk implements an instance of the UI Object 402. An instance of this class is named driveC. A class named MyDiskProperties is provided to implement the Panel manager interface 408. The class MyDiskProperties displays the properties of a particular disk drive and an instance of this class is named diskProp. A class named Panel is used to manage displaying arbitrary panels (e.g., property sheets) on the UI. The MyDiskProperties class uses a Panel instance named pm to create the disk property sheet. In each case were the properties of a disk is required to be displayed, the code is configured to determine whether the panel is already being displayed. Illustratively, the pseudo-code contained in Table I utilizes the object itself (i.e., driveC) rather than an object identifier as was done in embodiments described above. The display method 408B of the MyDiskProperties class is illustrated with the pseudo-code contained in Table II. In particular, the code of Table II represents an embodiment of the logic contained in FIG. 7.

TABLE I

| | |
|---|---|
| 001 | // Get the disk properties panel manager from the active panels list. |
| 002 | PanelManager diskProp = ActivePanelList.GET_ACTIVE_PANEL(driveC, |
| 003 | MyDiskProperties.PANEL_TYPE); |
| 004 | |
| 005 | // Check if the disk properties panel manager class needs to be created |
| 006 | if (diskProp == null) |
| 007 | // Create a new disk properties panel manager class |
| 008 | diskProp = new MyDiskProperties(driveC); |
| 009 | |
| 010 | // Display the disk properties panel |
| 011 | diskProp.DISPLAY( ); |

TABLE II

| | |
|---|---|
| 001 | if (pm != null) { // Check if the panel is already being displayed. |
| 002 | |
| 003 | // Redisplay the existing panel (bring it to the front of the GUI). |
| 004 | pm.show( ); |
| 005 | |
| 006 | } // End if the panel is already being displayed. |
| 007 | |
| 008 | else { // Create and display a new panel (note: some logic omitted) |
| 009 | |
| 010 | // Create a new Panel object for the disk properties panel |
| 011 | pm = new Panel(. . .); |
| 012 | |
| 013 | // Add this disk properties panel manager to the active panel list |
| 014 | ActivePanelList.ADD_ACTIVE_PANEL(this); |
| 015 | |
| 016 | // Display the disk properties panel to the user |
| 017 | pm.setVisible(true); |
| 018 | |
| 019 | } // End else create and display a new panel |

While the foregoing is directed to the preferred embodiment of the present invention, other and further embodiments of the invention may be devised without departing from the basic scope thereof, and the scope thereof is determined by the claims that follow.

What is claimed is:

1. A system, comprising:
an input device configured to receive input events;
a display device configured to display an image for each of at least two objects in a user interface (UI);
a memory comprising a display program comprising (i) an image tracking mechanism configured to contain a reference to each active image and (ii) an active panel method configured to request a key for an image to be displayed, wherein the key is a unique value for the image to be displayed; and
a processor operably connected to the display device and the input device and configured to receive the input events; wherein the processor, when executing the display program, is configured to:

(a) track each image that is currently active using the reference associated with each image and contained in the image tracking mechanism;

(b) receive an event indicating that a first image associated with a first object is to be displayed on the display device;

(c) determine whether the first image is already active by determining whether a match exists between a first image key associated with the first image and a unique image value for each active image referenced in the image tracking mechanism;

(d) if the first image is already active, reposition the image into a viewable position in the display device; and (e) if the first image is not already active, create the image, store a reference to the image in the image tracking mechanism and display the image in the prominent viewing position.

2. The system of claim 1, wherein the display program further comprises:

a UI object configured to provide a unique object identifier for an object being acted upon by the event, wherein the unique object identifier is utilized to construct the key and the unique image value for each active image; and an image manager configured to create an image manager instance for each image, wherein each image manager instance comprises (i) an image identifier method configured to request the unique image value identifying the image manager instance and (ii) a display method configured to display the image.

3. The system of claim 1, wherein the event is received from the input device and provides an object reference and an action to perform on the object.

4. The system of claim 1, wherein the processor is configured to track each image that is currently active by storing the reference associated to each image to the image tracking mechanism.

5. The system of claim 1, wherein the prominent viewing position is in a foreground of the UI.

6. The system of claim 1, wherein the prominent viewing position is in a foreground of the UI relative to at least a second image.

7. The system of claim 1, wherein the image is at least one of a window and a panel.

8. The system of claim 1, wherein the key is comprises a unique object identifier associated with an object being acted on by the event and an image type.

9. The system of claim 1, wherein the unique image value is constructed for each reference contained in the image tracking mechanism by using (i) a unique object identifier for an object being acted on by the event and (ii) an image type determined according to the reference.

10. The system of claim 9, wherein the display program further comprises an image manager class for each image manager instance and wherein the image manager class comprises a static data element representing the image type.

11. The system of claim 1, wherein the active panel method is further configured to request a unique identifier for each active image referenced in the image tracking mechanism.

12. The system of claim 1, wherein the key is comprises (i) a unique object identifier associated with an object being acted on by the event; and (ii) an image type and wherein the unique image value is constructed for each image referenced in the image tracking mechanism by using (i) the unique object identifier for the object being acted on by the event and (ii) an image type of the respective referenced image.

13. A method of displaying an image in a user interface containing at least two images each having an associated object, the method comprising:

receiving an event that a first image associated with a first object is to be displayed in the user interface;

constructing a key uniquely identifying the first image;

determining whether the key matches a unique image value for each additional image active in the user interface, wherein a match indicates that the first image is already active in the user interface; and if the key matches, repositioning the first image into a viewable position within the user interface; and if the key does not match, creating the first image and displaying the first image in the user interface.

14. The method of claim 13, wherein constructing the key comprises combining an image type and an object reference, wherein the object reference is resolved to a unique object identifier for the first object.

15. The method of claim 13, wherein creating the first image comprises storing a reference to the first image in a tracking object.

16. The method of claim 13, wherein repositioning the first image into a viewable position comprises positioning the first image into a foreground of the user interface relative to each additional image active in the user interface.

17. The method of claim 13, wherein determining whether the key matches the unique image value for each additional image active in the user interface comprises accessing a list containing an image reference to each additional image.

18. The method of claim 17, further comprising, for each image reference contained in the list:

passing a reference image type and object reference to an image identifier building method, wherein the reference image type identifies a type of image associated with the image reference and the object reference references the first object;

resolving the object reference to a unique object identifier for the first object; and combining the unique object identifier for the first object with the panel type to provide the unique image value.

19. The method of claim 18, wherein constructing the key comprises combining an image type for the first image and the object reference.

20. The method of claim 13, further comprising constructing the unique image value for each additional image active in the user interface; wherein each unique image value comprises (i) an image type of the respective active image; and (ii) a unique object identifier for the first object; and wherein the key comprises (i) an image type of the first image; and (ii) the unique object identifier for the first object.

21. A signal bearing medium, comprising a program which, when executed by a processor, performs a method of displaying an image in a user interface containing at least two images each having an associated object, the method comprising:

receiving an event prompting a first image associated with a first object is to be displayed in the user interface;

constructing a key uniquely identifying the first image;

determining whether the key matches a unique image value for each additional image active in the user interface, wherein a match indicates that the first image is already active in the user interface; and if the key matches, repositioning the first image into a viewable position within the user interface; and if the key does not match, creating the first image and displaying the first image in the user interface.

22. The signal bearing medium of claim 21, wherein constructing the key comprises combining an image type and an object reference, wherein the object reference is resolved to a unique object identifier for the first object.

23. The signal bearing medium of claim 21, wherein creating the first image comprises storing a reference to the first image in a tracking object.

24. The signal bearing medium of claim 21, wherein repositioning the first image into a viewable position comprises positioning the first image into a foreground of the user interface relative to each additional image active in the user interface.

25. The signal bearing medium of claim 21, wherein determining whether the key matches the unique image value for each additional image active in the user interface comprises accessing a list containing an image reference to each additional image.

26. The signal bearing medium of claim 25, further comprising, for each image reference contained in the list:

passing a reference image type and object reference to an image identifier building method, wherein the reference image type identifies a type of image associated with the image reference and the object reference references the first object;

resolving the object reference to a unique object identifier for the first object; and combining the unique object identifier for the first object with the panel type to provide the unique image value.

27. The signal bearing medium of claim 26, wherein constructing the key comprises combining an image type for the first image and the object reference.

28. The signal bearing medium of claim 21, further comprising constructing the unique image value for each additional image active in the user interface; wherein each unique image value comprises (i) an image type of the respective active image; and (ii) a unique object identifier for the first object; and wherein the key comprises (i) an image type of the first image; and (ii) the unique object identifier for the first object.

* * * * *